(12) United States Patent
Jones et al.

(10) Patent No.: US 8,775,945 B2
(45) Date of Patent: Jul. 8, 2014

(54) SYNCHRONIZATION OF ADVERTISMENT DISPLAY UPDATES WITH USER REVISITATION RATES

(75) Inventors: M. Cameron Jones, Seattle, WA (US); David Ayman Shamma, San Francisco, CA (US); Elizabeth F. Churchill, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 636 days.

(21) Appl. No.: 12/554,605

(22) Filed: Sep. 4, 2009

(65) Prior Publication Data

US 2011/0061001 A1 Mar. 10, 2011

(51) Int. Cl.
*G06F 17/30* (2006.01)
*G06Q 30/02* (2012.01)

(52) U.S. Cl.
USPC ........... 715/744; 715/205; 715/234; 715/738; 715/745; 715/760

(58) Field of Classification Search
CPC .......... G06F 17/30876; G06F 17/3089; G06F 17/30905; G06Q 30/0272
USPC ....................................................... 715/744
See application file for complete search history.

(56) References Cited

U.S. PATENT DOCUMENTS

| | | | |
|---|---|---|---|
| 5,937,392 A * | 8/1999 | Alberts ...................... | 705/14.52 |
| 5,948,061 A * | 9/1999 | Merriman et al. ........... | 709/219 |
| 7,065,713 B1 * | 6/2006 | Dutta et al. .................. | 715/768 |
| 7,466,241 B2 * | 12/2008 | Lyle et al. .................... | 340/905 |
| 7,523,096 B2 | 4/2009 | Badros et al. | |
| 7,945,556 B1 * | 5/2011 | Barnes et al. ................. | 707/710 |
| 8,271,495 B1 * | 9/2012 | Skrenta et al. ................ | 707/738 |
| 2002/0133398 A1 * | 9/2002 | Geller et al. .................... | 705/14 |
| 2003/0065706 A1 | 4/2003 | Smyth et al. | |
| 2005/0027587 A1 * | 2/2005 | Latona et al. .................. | 705/10 |
| 2005/0138067 A1 | 6/2005 | Billsus et al. | |
| 2006/0064470 A1 * | 3/2006 | Sargent et al. ................ | 709/219 |
| 2006/0294258 A1 | 12/2006 | Powers-Boyle et al. | |
| 2007/0255754 A1 | 11/2007 | Gheel | |
| 2008/0046923 A1 | 2/2008 | Enderwick | |
| 2008/0104256 A1 * | 5/2008 | Olston ......................... | 709/228 |
| 2008/0148161 A1 * | 6/2008 | Hebert et al. ................. | 715/760 |

(Continued)

FOREIGN PATENT DOCUMENTS

WO 2011028367 A2 3/2011

OTHER PUBLICATIONS

Search Report and Written Opinion for International Application No. PCT/US2010/044894 mailed Feb. 25, 2011, 10 pages.

(Continued)

*Primary Examiner* — Alvin Tan
(74) *Attorney, Agent, or Firm* — Berkeley Law & Technology Group, LLP

(57) ABSTRACT

Techniques for displaying advertisements on web pages are provided. A revisitation rate for views of a web page by a user population is determined. A refresh rate for an advertisement space on the web page is synchronized with the determined revisitation rate. An advertisement is selected to be displayed at the advertisement space at a particular refresh time of the synchronized refresh rate. The advertisement is selected based at least on a difference between a content of the web page at the particular refresh time and a content of the web page at a previous refresh time of the synchronized refresh rate.

3 Claims, 6 Drawing Sheets

(56) References Cited

U.S. PATENT DOCUMENTS

| | | |
|---|---|---|
| 2008/0255943 A1 | 10/2008 | Morten et al. |
| 2008/0281817 A1 | 11/2008 | White et al. |
| 2008/0288349 A1* | 11/2008 | Weisberg et al. ............... 705/14 |
| 2009/0024946 A1 | 1/2009 | Gotz |
| 2009/0024962 A1 | 1/2009 | Gotz |
| 2009/0112781 A1 | 4/2009 | Heath et al. |
| 2009/0248524 A1* | 10/2009 | Defoy et al. ................. 705/14.1 |
| 2010/0306665 A1 | 12/2010 | Milic-Frayling et al. |
| 2012/0179985 A1* | 7/2012 | Lection et al. ................ 715/760 |

OTHER PUBLICATIONS

Tauscher, et al., "Revisitation Patterns in World Wide Web Navigation", Proceedings of the Conference on Human Factors in Computing Systems, 1997, 8 pages.

Adar et al., "Resonance on the Web: Web Dynamics and Revisitation Patterns," Commputer Human Interaction (CHI) Conference, Apr. 4-9, 2009, Association for Computing Machinery (ACM), pp. 1381-1390.

* cited by examiner

SYNCHRONIZATION OF ADVERTISMENT DISPLAY UPDATES WITH USER REVISITATION RATES

BACKGROUND OF THE INVENTION

1. Field of the Invention

The present invention relates to the selection of advertisements for display in online web pages.

2. Background

According to one definition, advertising is a paid, one-way communication through a medium in which an advertiser is identified, and the message (i.e., the advertisement) provided by the advertiser is controlled. Advertising may be performed for a variety of purposes, including publicity, public relations, product placement, sponsorship, underwriting, and sales promotion. A variety of mediums are used to convey an advertisement, including television, radio, movies, magazines, newspapers, the Internet, and billboards.

Online Advertising relates to the promoting of products and services using the Internet and World Wide Web. Typical online advertisement types include banner ads, floating ads, pop-up ads, and video ads which are provided through a browser to the user's computer desktop. Such advertisements may be placed on a web page to be displayed to the user when loaded by a browser, for example. "Contextual advertising" refers to a form of Internet advertising/marketing where advertisements are selected and served by automated systems based on content displayed to the user. For example, a contextual advertisement selection system may scan the text of a web page for keywords, and select advertisements based on any keywords located in the text. When the web page is displayed for the user, contextual advertisement selection system provides the selected advertisements for display on the web page.

Users may visit particular web pages over and over if they find the content provided by the web pages to be enjoyable and/or useful. For example, a user may repeatedly visit a same web page to check for updates or changes to the content of the web page. Current techniques for advertising do not fully take into account the tendencies of users to revisit web pages. As a result, such techniques may not provide advertisements to users with as high of relevance as possible, leading to lower ad revenue, among other issues.

BRIEF SUMMARY OF THE INVENTION

Techniques for displaying advertisements on web pages are provided. Users of a user population may view a particular web page repeatedly. The user population may include one or more users. A revisitation pattern of the user population is measured and/or calculated. The rate at which advertisements on the web page are changed—the advertisement "refresh rate"—is synchronized with the determined revisitation pattern. One or more advertisements are selected to be displayed on the web page at each refresh time of the synchronized refresh rate based on changes in content provided by the web page since a prior refresh time. In this manner, advertisements may be updated in a manner that is better aligned with the interests of the user population and with the revisiting tendencies of the user population.

In a first implementation, a method for displaying advertisements on web pages is provided. A revisitation rate for views of a web page by a user population is determined. A refresh rate for an advertisement space on the web page is synchronized with the determined revisitation rate. An advertisement is selected to be displayed at the advertisement space at a particular refresh time of the synchronized refresh rate. The advertisement is selected based at least on a difference between a content of the web page at the particular refresh time and a content of the web page at a previous refresh time of the synchronized refresh rate.

In another implementation, a system for displaying advertisements on web pages is provided. The system includes a revisitation rate determiner, a refresh rate synchronizer, and an advertisement selector. The revisitation rate determiner is configured to determine a revisitation rate for views of a web page by a user population. The refresh rate synchronizer is configured to synchronize a refresh rate for an advertisement space on the web page with the determined revisitation rate. The advertisement selector is configured to select an advertisement to be displayed at the advertisement space at a particular refresh time of the synchronized refresh rate based at least on a difference between a content of the web page at the particular refresh time and a content of the web page at a previous refresh time of the synchronized refresh rate.

Computer program products are also described herein. The computer program products include a computer-readable medium having computer program logic recorded thereon for enabling advertisements to be displayed in a web page, according to the implementations described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
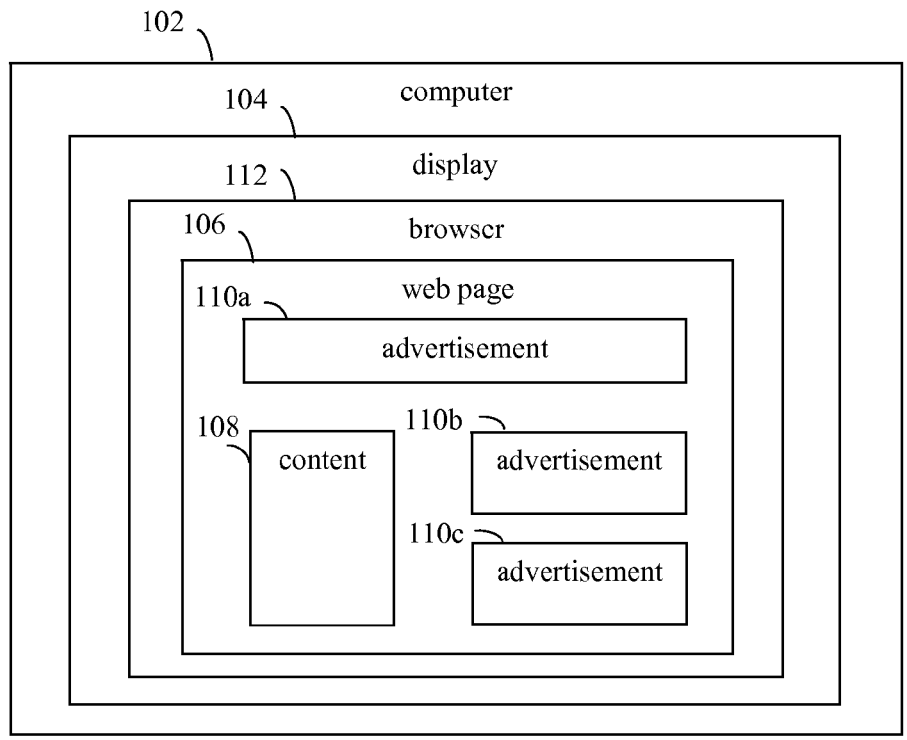
FIG. 1 shows an example of the displaying of advertisements on a web page.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Examples of Online Advertising

Embodiments of the present invention relate to online advertising. For instance, FIG. 1 shows a block diagram of an example of the displaying of advertisements on a web page 106. In the example of FIG. 1, a user may use a computer 102 to view content 108 included in web page 106. As shown in FIG. 1, computer 102 has a display 104 that displays web page 106. For example, web page 106 may be open in a web browser 112. The user may cause web page 106 to be displayed in any manner, including by navigating to web page 106 according to a URL (uniform resource locator) address for web page 106. Content 108 may be selected by a developer or other entity associated with web page 106 to be included in web page 106. Content 108 may include any one or more of text, images (e.g., GIF file images, JPG file images, etc), video (e.g., MPEG file videos, etc.), audio (e.g., WAV file audio, etc.), multi-media objects, etc. Furthermore, web page 106 may include any number and arrangement of advertisements, including advertisements 110a-110c shown in FIG. 1. Advertisements 110a-110c may be displayed according to any suitable form, including as banner ads, floating ads, pop-up ads, and video ads.

In the example of FIG. 1, advertisement 110a is shown as a banner ad at the top of web page 106 (e.g., a North banner), and advertisements 110b and 110c are both positioned adjacent to a right edge of web page 106, while content 108 is shown positioned adjacent to a left edge of web page 106. However, in embodiments, web page 106 may include any arrangement of content 108 and advertisements 110. Advertisements 110a-110c may be selected for display in any manner, including by searching on text included in content 108, and selecting advertisements that are related to keywords found in the searched text.

Users tend to revisit web pages of interest to check for updates or changes to the content of the web pages. Some types of web pages have predictable signatures of user revisitation, where users of a particular web page may revisit the web page according to a particular pattern. For example, particular content of the web page www.woot.com is updated once every 24 hours, when a particular item for sale, the daily updated deal, is updated. Thus, some users may visit www.woot.com at predictable intervals (e.g., once every 24 hours) to see the daily updated deal. In another example, blog visitors may tend to revisit blog web sites at particular times/frequencies once they learn the frequency of postings by authors of the blogs. Facebook™ profiles, Twitter® updates, blog sites, personal homepages, news sites, shopping sites, discussion forums, etc., all may have different revisitation patterns—different revisitation patterns from each other and for web sites/pages within each category.

Current techniques for advertising do not fully take into account the tendencies of users to revisit web pages to provide advertisements of greater interest to the users. Embodiments are described herein for using revisitation patterns of users to provide more relevant advertisements to the users. Examples of such embodiment are described as follows.

III. Example Embodiments

Example embodiments are described herein for selecting advertisements for display in web pages based on user revisitation rates. The example embodiments described herein are provided for illustrative purposes, and are not limiting. Further structural and operational embodiments, including modifications/alterations, will become apparent to persons skilled in the relevant art(s) from the teachings herein.

In embodiments, revisitation patterns of users are used to provide enhanced online advertising. For example, the intervals between the repeated visits of one or more users to one or more particular web pages may be measured and used to generate a model of revisitation to that web page. This model may be used in combination with determined content changes to a web page to enable advertisements to be selected for display on the web page that are more aligned with the interests of the users. Furthermore, in an embodiment, transactional information regarding the revisit (e.g., was something purchased by the user on the web page) may be taken into account when selecting an advertisement. For instance, the revisitation history of the user may be processed to determine a purchasing propensity of the visitor to further influence advertisement selection. Revisitation information can also be used to display ads in a progressive succession, allowing for multi-message advertisement campaigns to be delivered, and/or for advertisements to build-off and/or respond to each other. In embodiments, advertisements may be tied to specific visitations in a broader revisitation pattern (e.g., advertisement may be shown on the first visit of the day, on the third visit after the user had been exposed to two previous ads, etc.).

Benefits are provided by synchronizing the update of advertisements to revisitation patterns of one or more users and focusing the relevance of selected advertisements to updated regions of web pages. For instance, the probabilities that users may notice the advertisements (e.g., because the advertisement is part of the recently updated content on the page) and that users may find the advertisements relevant to his/her current level of interest or intent are increased. As such, the users may be more likely to click on the advertisements, potentially providing advertisers with additional revenue.

Conventional techniques for updating advertisements, including updating advertisements at pre-determined or fixed intervals that are not synchronized with user viewing habits, have disadvantages. For instance, the updating of advertisements on a web page upon every page view creates computational burdens and relevance issues. Advertisements having low relevance tend to be displayed when the advertisements are selected based on an entire content or a general purpose/audience of the web page, or when the advertisements are selected without regard at all to the content of the web page. Embodiments for advertisement matching based on revisitation rates may reduce such computational burdens and relevance issues. In other embodiments, revisitation rates may be taken into account with other advertisement matching factors, which may increase an overall computational burden, but may enable improved advertisement matching.

Conventionally updating advertisements at fixed intervals (without taking into account revisitation rates) can undesirably result in a user viewing the same advertisement repeatedly if the user's revisitation period is shorter than the fixed interval for updating. Repeated exposure of a user to a non-relevant advertisement does not increase the advertisement relevance. By taking into account revisitation rates, there is an opportunity to show a user additional and more varied advertisement content, increasing the likelihood that a relevant advertisement may be displayed to the user.

In an embodiment, tying advertisement updates solely to the timing of content-updates can improve the relevance of the advertisement to the content of a web page. However, user visitation cycles may have longer or shorter periods than content-update cycles, such that either stale advertisements are being displayed, or excessive computational resources are being invested in updating advertisements that the user does not view. As such, embodiments for tying advertisement updates to the timing of content-updates and user revisitation rates can improve advertisement relevance, while avoiding stale advertisements from being displayed and saving computational resources.

In embodiments, user behavior may be aggregated on a large-scale, making it easier/more efficient to synchronize display of advertisement with time periods during which the advertisements have significant impact. In an embodiment, a user population may be considered to be a homogeneous population. In another embodiment, a user population may be segmented into different groups (e.g., sub-populations), with each group including users having similar revisitation patterns, and with each group targeted differentially for advertising. In another embodiment, the visitation patterns of individual users may be tracked and used to select advertisements directed to each of the individual users.

As described above, revisitation patterns may be used in combination with changes in content on a web page (e.g., performance of a "diff" or difference between the current content of the web page versus content shown previously on the web page) to select advertisements. A "diff" performed on a current version of a web page and a previous version of the web page determines content changes to that web page since a previous visit to the web page. A revisitation pattern may be used to filter the content to identify more precisely the salient differences, those in which the user is most likely to be interested. Revisitation patterns may describe long-term trends of repeated interaction with a web page and can be used to gauge user interest, intent, and focus, beyond looking just at content changes of the web page. It is noted that when user behavior departs from the expected revisitation pattern, such a behavior change may be an indication of the user's interest (e.g., returning to a page to reread something, or grab a link to share, etc.), and this behavior change may be taken into account when selecting an advertisement. Furthermore, temporal patterns of revisitation a may be used to restructure and redesign content and web page layouts to improve the experience of the user.

Figure 2:
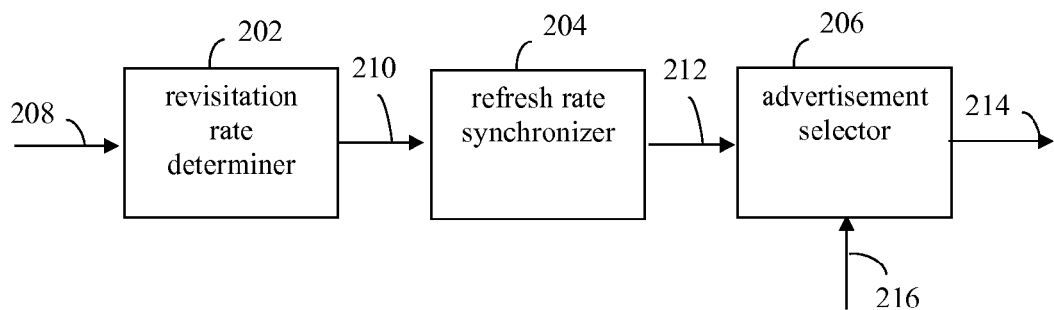
FIG. 2 shows a block diagram of an advertisement selection system, according to an example embodiment.

Various embodiments for selecting advertisements for display on web pages based on revisitation rates are described herein. For instance, FIG. 2 shows a block diagram of an advertisement selection system 200, according to an example embodiment. As shown in FIG. 2, system 200 includes a revisitation rate determiner 202, a refresh rate synchronizer 204, and an advertisement selector 206. These elements of system 200 are described as follows.

As shown in FIG. 2, revisitation rate determiner 202 receives page view information 208. Revisitation rate determiner 202 is configured to generate a revisitation rate 210 based on page view information 208. For example, page view information 208 may include information indicating times at which a user population (e.g., a single user, a group of users) viewed a particular web page. Revisitation rate determiner 202 generates revisitation rate 210 based on the received time information.

Revisitation rate 210 indicates a determined rate of revisitation by the user population, and may have any suitable form, including being in the form of a frequency value, a period or cycle time, a clock signal that includes pulses at the determined revisitation rate, etc.

Refresh rate synchronizer 204 receives revisitation rate 210, and is configured to generate a synchronized refresh rate 212. Synchronized refresh rate 212 indicates a refresh rate for advertisements to be displayed on the web page. Synchronized refresh rate 212 may have any suitable form, including being in the form of a frequency value, a period or cycle time, a clock signal that includes ad refresh pulses at the synchronized refresh rate, etc.

Advertisement selector 206 receives synchronized refresh rate 212 and content information 216. Content information 216 provides information regarding content of the web page of interest. For example, content information 216 may provide information indicating a current content of the web page, a previous content of the web page, and/or a difference between the current content and previous content of the web page. Advertisement selector 206 is configured to generate an advertisement selection 214 based on synchronized refresh rate 212 and content information 216.

Advertisement selection 214 indicates an advertisement that may be provided (e.g., by an ad server) to be displayed on the web page at refresh time indicated by synchronized refresh rate 212 (e.g., a next refresh time).

Revisitation rate determiner 202, refresh rate synchronizer 204, and advertisement selector 206 may be implemented in hardware, software, firmware, or any combination thereof. For example, revisitation rate determiner 202, refresh rate synchronizer 204, and advertisement selector 206 may be implemented as computer code configured to be executed in one or more processors. Alternatively, revisitation rate determiner 202, refresh rate synchronizer 204, and advertisement selector 206 may be implemented as hardware logic/electrical circuitry. Advertisement selection system 200 may be implemented in various ways. For example, in an embodiment, revisitation rate determiner 202, refresh rate synchronizer 204, and advertisement selector 206 may be hosted on different computer systems, and may communicate with each other through a network. In another embodiment, revisitation rate determiner 202, refresh rate synchronizer 204, and advertisement selector 206 may be present on the same computer system, and thus may communicate with each other in an inter-computer manner.

Figure 3:
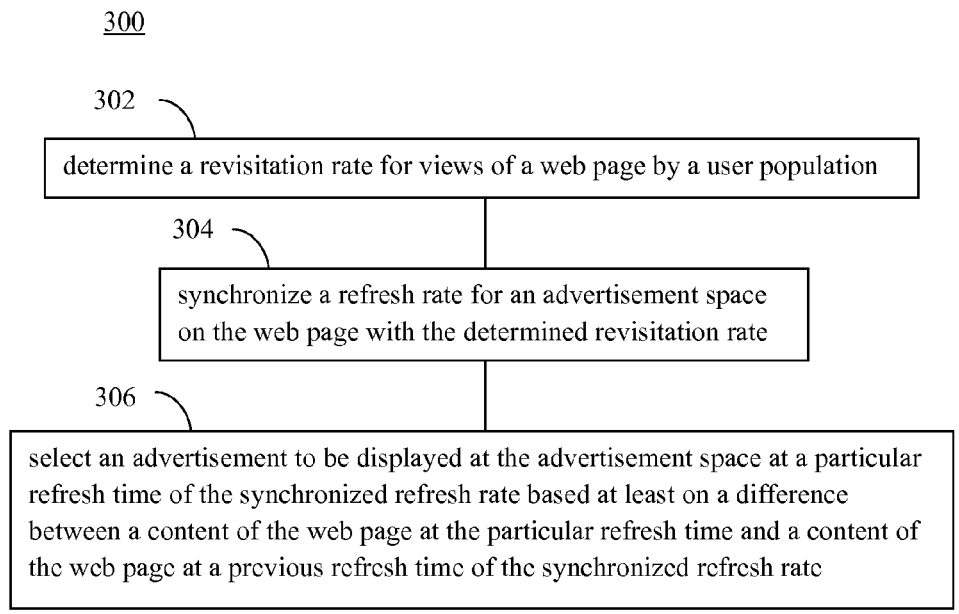
FIG. 3 shows a flowchart for selecting advertisements, according to an example embodiment.

System 200 is described as follows with respect to FIG. 3. FIG. 3 shows a flowchart 300 for selecting advertisements, according to an example embodiment of the present invention. System 200 shown in FIG. 2 may operate according to flowchart 300, for example. Further structural and operational embodiments will be apparent to persons skilled in the relevant art(s) based on the discussion regarding flowchart 300. Flowchart 300 is described as follows.

Flowchart 300 begins with step 302. In step 302, a revisitation rate for views of a web page by a user population is determined. For example, in an embodiment, revisitation rate determiner 202 may be configured to determine a revisitation rate for views of a web page by a user population. As described above, revisitation rate determiner 202 may receive page view information 208. Page view information 208 may include information regarding views of a web page (e.g., web page 106 in FIG. 1) by one or more users. For example, page view information 208 may indicate one or more times (e.g., time stamps) at which views of the web page occurred for each user. Page view information 208 is used by revisitation rate determiner 202 to generate revisitation rate 210.

Figure 4:
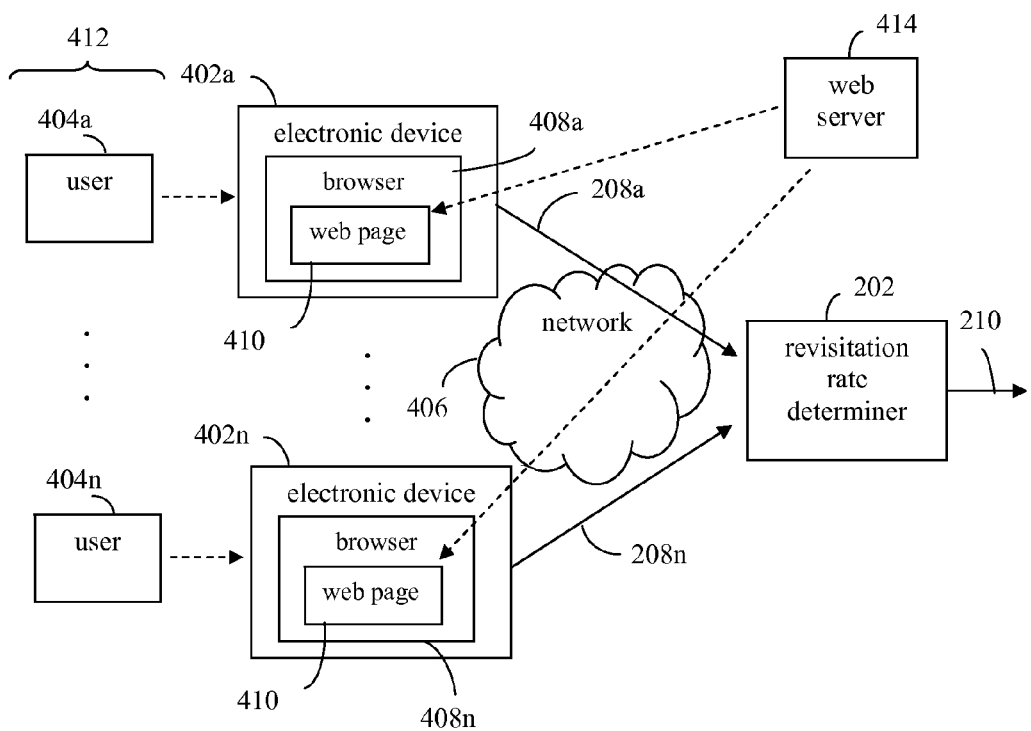
FIG. 4 shows a block diagram of a communication system in which a revisitation rate determiner may be implemented, in an example embodiment.

For instance, FIG. 4 shows a block diagram of a communication system 400 in which revisitation rate determiner 202 may receive page view information, in an embodiment. As shown in FIG. 4, system 400 includes a user population 412, a plurality of electronic devices 402a-402n, a network 406, a web server 414, and revisitation rate determiner 202. In the example of FIG. 4, user population 412 includes first-nth users 404a-404n. In embodiments, user population 412 may include any number of one or more users 404. Each of users 404a-404n accesses a corresponding one or electronic devices 402a-402n to view a web page 410 using a respective one of browsers 408a-408n. Electronic devices 402 may each be any type of electronic device that may be configured with web browsing functionality, including a desktop computer (e.g., a personal computer, etc.), a mobile computing device (e.g., a cell phone, smart phone, a personal digital assistant (PDA), a laptop computer, a notebook computer, etc.), or a mobile email device (e.g., a RIM Blackberry® device).

As shown in FIG. 4, each electronic device 402 is configured to communicate through network 406 (e.g., by a corresponding communication link not shown in FIG. 4) with other entities, including revisitation rate determiner 202 and web server 414. Network 406 may be any type of communication network, such as a local area network (LAN), a wide area network (WAN), a personal area network (PAN), or a combination of communication networks. In embodiments, network 406 may include the Internet and/or an intranet. In embodiments where network 406 includes the Internet, web pages, such as web page 410, which form a portion of the World Wide Web, are available for retrieval by electronic devices 402 through network 406. On the Internet, web pages may be identified/located by a uniform resource locator (URL), such as http://www.yahoo.com, and/or by other mechanisms. Electronic devices 402 can each access web page 410 through network 406 by inputting/clicking on a URL corresponding to web page 410 in the corresponding browser 408, which in turn transmits a request for web page 410 to web server 414. As shown in FIG. 4, in response to a request transmitted from each of electronic devices 402a-402n, web server 414 transmits web page 410 to each of electronic devices 402a-402n for loading and display in browsers 408a-408n.

In embodiments, web page 410 may be expressed in the form of program code (e.g., hypertext markup language (HTML) code). Browsers 408 may receive the source code corresponding to web page 410 from web server 414 that is used to display web page 410. Each browser 408 may obtain content for web page 410 as indicated by the source code by accessing one or more content servers through network 406. Furthermore, web browser 608 may obtain one or more advertisements (e.g., advertisements 110a-110c in FIG. 1) for web page 410 by accessing an advertisement server through network 406 according to the source code.

Figure 5:
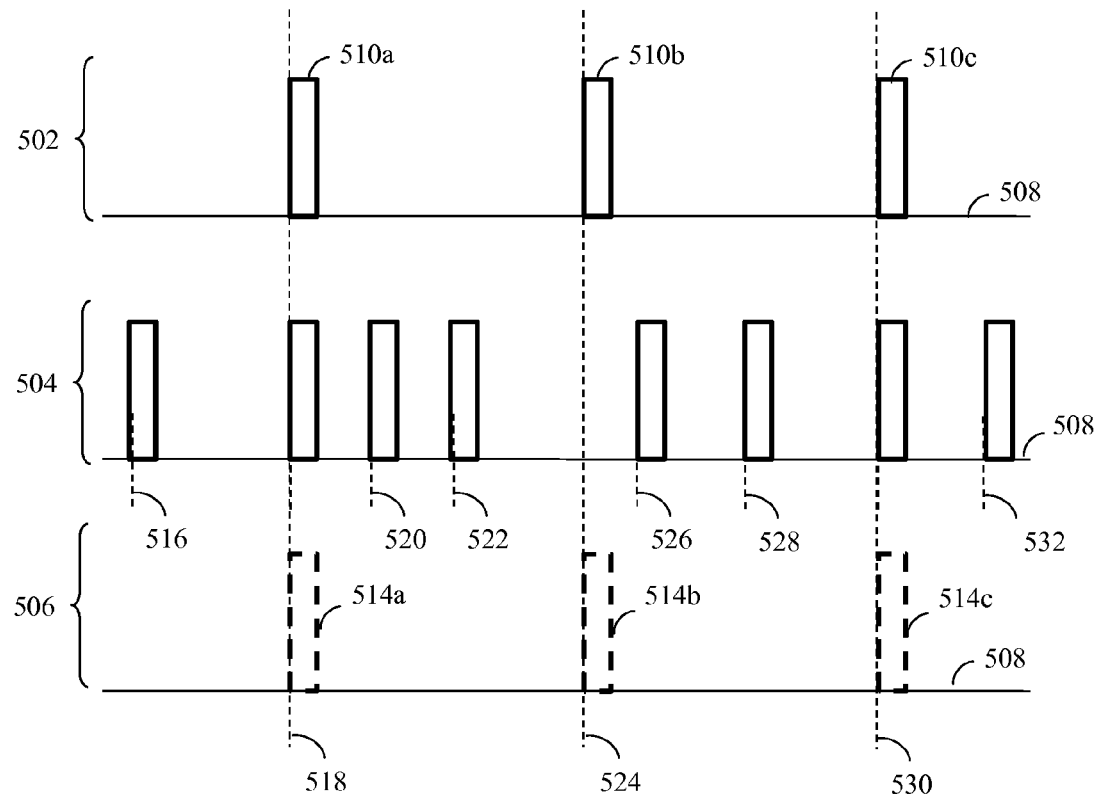
FIG. 5 shows example graphs of data related to web page revisitation, according to embodiments.

Each user that repeatedly downloads web page 410 for viewing may perform downloads of web page 410 according to their own revisitation pattern. For instance, FIG. 5 shows example graphs of data related to web page revisitation, according to an embodiment. In FIG. 5, first-third graphs 502, 504, and 506 are shown, each having a timeline 508 as an x-axis. First-ninth time points 516, 518, 520, 522, 524, 526, 528, 530, and 532 are indicated on timeline 508 in time-series. First graph 502 indicates points in time that a user, such as user 404a of FIG. 4, views web page 410, referred to as user page views 510. For example, as shown in FIG. 5, user 404a may have viewed (e.g., downloaded using browser 408a) web page 410 at second time point 518 (first user page view 510a), fifth time point 524 (second user page view 510b), and eighth time point 530 (third user page view 510c). At each of time points 518, 524, and 530, web page 410 may have displayed the same or different content and/or one or more of the same or different advertisements when viewed by user 404a. For example, second graph 504 indicates points in time that content of web page 410 was modified. As indicated in FIG. 5, content of web page 410 was modified at each of first time point 516, second time point 518, third time point 520, fourth time point 522, sixth time point 526, seventh time point 528, eighth time point 530, and ninth time point 532. Thus, content of web page 410 is updated twice (time points 516 and 518) prior to being viewed by user 404a at time point 518, is updated twice (time points 520 and 522) prior to being viewed by user 404a at time point 524, and is updated three times (time points 526, 528, and 530) prior to being viewed by user 404a at time point 530.

The content update pattern for web page 410 indicated in FIG. 5 does not match the revisitation pattern for user 404a indicated in FIG. 5. As shown in FIG. 5, content of web page 410 is updated more frequently than user 404a views web page 410, which may lead to inefficient display of advertisements by web page 410. For example, if advertisements displayed on web page 410 are updated at the time points when content is updated on web page 410, user 404a does not have the opportunity to view all of the advertisements (e.g., user 404a would not see an advertisement designated for web page 410 at time point 516 if it is replaced with another advertisement at time point 518).

Revisitation rate determiner 202 is configured to determine revisitation rate 210 for views of a web page by a user population to enable more efficient advertisement display and matching. Revisitation rate determiner 202 may be configured to determine a revisitation rate for a web page for one or more users of a user population in any suitable manner. For instance, in the example of FIG. 5, revisitation rate determiner 202 may receive page view information 208 including an indication of the time points at which user 404a views web page 410, such as time points 518, 524, and 530 (and potentially additional time points). As shown in FIG. 4, revisitation rate determiner 202 may receive page view information 208a-208n corresponding to each of electronic devices 402a-402n separately from each of electronic devices 402a-402n. Alternatively, a server that provides web pages (e.g., (web server 414) may collect page view information for each of electronic devices 402a-402n, and the server may transmit page view information 208 to revisitation rate determiner 202.

For example, page view information may be collected at each of electronic devices 402 in a respective cookie stored at electronic devices 402, may be collected by browsers 408, may be collected by a plug-in/add-on to browsers 408, may be collected at a server that supplies web page 410 (e.g., web server 414), etc. Thus, page view information may be transmitted from each of electronic devices 402 and/or from the server in any form, including in the form of a cookie, in the form of time stamps stored in a file, etc.

Any number of time points for any number of users may be received in page view information 208. Revisitation rate determiner 202 may be configured to determine an average frequency or period for the time points, such as by determining differences in time between adjacent time points, and averaging the determined differences in time (e.g., adding together the time differences, and dividing the sum by the total number of determined time differences) to determine the revisitation rate.

In some cases, the time points received in page view information 208 for a user may be non-periodic (e.g., unequal lengths of time between adjacent time points). For instance, referring to FIG. 5 for user 404a, time point 518 may be 10 am on day X, time point 524 may be 2 pm on day X, and time point 530 may be 5 pm on day X. A first difference in time between time points 518 and 524 is 4 hours, and a second difference in time between time points 524 and 530 is 3 hours. An average of the determined first and second differences in time is (4+3)/2=3.5 hours. Thus, 3.5 hours may be a period for the determined revisitation rate, or the revisitation rate may be determined/expressed in the form of a frequency, such as 1/3.5=0.286 cycles/hour. In another example, as shown in FIG. 5, user 404a may view web page 410 in a periodic fashion (e.g., substantially equal lengths of time between adjacent time points). For instance, time point 518 may be 10 am, time point 524 may be 2 pm, and time point 530 may be 6 pm. In this example, the revisitation rate may be generated as (4+4)/2=4 hours (or 0.25 cycles/hour).

Figure 6:
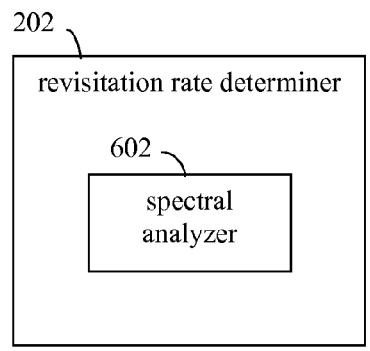
FIG. 6 shows a block diagram of a revisitation rate determiner, according to an embodiment.

It is noted that although the current examples includes time points for a single user—user 404a—to generate a revisitation rate, a revisitation rate may be generated for a user population that includes any number of users, including tens, hundreds, thousands, or millions of users. For instance, in one embodiment, a revisitation rate may be separately generated for each user of a plurality of users, and the revisitation rates for all users may be averaged together to generate a revisitation rate for the plurality of users. In another example, FIG. 6 shows a block diagram of revisitation rate determiner 202, according to an embodiment. As shown in FIG. 6, revisitation rate determiner 202 includes a spectral analyzer 602. When present, spectral analyzer 602 may be configured to perform spectral analysis on page view information 208 to determine a revisitation rate for any number of users in a user population, as would be known to persons skilled in the relevant art(s). For instance, spectral analyzer 602 may use spectral analysis (e.g., Fourier analysis) to determine a dominant frequency as a revisitation rate for the user population, may determine multiple frequencies, with each frequency used as a revisitation rate for a sub-group of a user population, etc. Revisitation rate determiner 202 may calculate revisitation rate 210 in alternative ways, as would be known to persons skilled in the relevant art(s).

Referring back to FIG. 3, in step 304, a refresh rate for an advertisement space on the web page is synchronized with the determined revisitation rate. For example, in an embodiment, refresh rate synchronizer 204 may be configured to determine a refresh rate for advertisements on a web page. As described above, refresh rate synchronizer 204 may receive revisitation rate 210. Revisitation rate 210 includes a revisitation rate for one or more users regarding views of a web page (e.g., web page 106 in FIG. 1 or web page 410 of FIG. 4) by one or more users. Revisitation rate 210 is used by refresh rate synchronizer 204 to generate synchronized refresh rate 212. Synchronized refresh rate 212 indicates a refresh rate for advertisements to be displayed on the web page. Synchronized refresh rate 212 may have any suitable form, including being in the form of a frequency value, a period or cycle time, etc.

For example, in one embodiment, refresh rate synchronizer 204 may be configured to set synchronized refresh rate 212 to be substantially equal to revisitation rate 210. For instance, third graph 506 shown in FIG. 5 indicates points in time that are refresh times for advertisements on a web page, such as web page 410 in the example of FIG. 4, according to synchronized refresh rate 212. As shown in FIG. 5, synchronized refresh rate 212 includes a first refresh indication (or pulse) 514a at a refresh time of time point 518, a second refresh indication 514b at a refresh time of time point 524, and a third refresh indication 514c at a refresh time of time point 530. In this example, refresh rate synchronizer 204 generates synchronized refresh rate 212 to include refresh indications/pulses at each of time points 518, 524, 530, synchronized with views of web page 410 by user 404a (as indicated by first graph 502). Thus, in such a case, each time that user 404a views web page 410, a different advertisement may be displayed.

Figure 7:
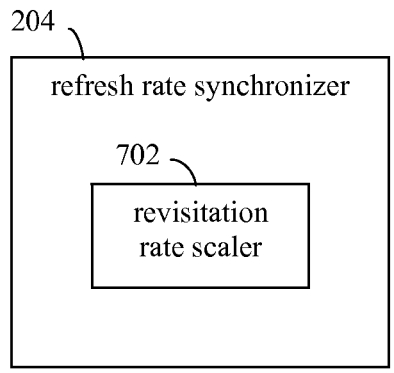
FIG. 7 shows a block diagram of a refresh rate synchronizer, according to an example embodiment.

In another example, refresh rate synchronizer 204 may be configured to set synchronized refresh rate 212 to be a scaled version of revisitation rate 210. For instance, FIG. 7 shows a block diagram of refresh rate synchronizer 204, according to an example embodiment. As shown in FIG. 7, refresh rate synchronizer 204 may include a revisitation rate scaler 702. Revisitation rate scaler 702 is configured to scale (e.g., multiply or divide) revisitation rate 210 according to a scale factor to generate synchronized refresh rate 212. For instance, revisitation rate scaler 702 may be configured to calculate synchronized refresh rate 212 by dividing or multiplying revisitation rate by a scale factor N, where N is an integer. When N is equal to 1, synchronized refresh rate 212 may be generated to include a refresh indication for each cycle of revisitation rate 210 (as described in the preceding paragraph). When N is greater than 1, synchronized refresh rate 212 may be generated to include a refresh indication for every N web page views indicated by revisitation rate 210.

For example, referring to FIG. 5, if N is set equal to 2, synchronized refresh rate 212 may be generated to include refresh indications 514a and 514c, etc. (at every other user page view 510—user page views 510a, 510c, 510e, etc.). If N is set equal to 3, synchronized refresh rate 212 may be generated to include refresh indication 514a and subsequent refresh indications at every third subsequent user page view 510 (user page views 510a, 510d, etc.). Scale factor N may have any value greater than or equal to 1.

Referring back to FIG. 3, in step 306, an advertisement is selected to be displayed at the advertisement space at a particular refresh time of the synchronized refresh rate based at least on a difference between a content of the web page at the particular refresh time and a content of the web page at a previous refresh time of the synchronized refresh rate. For example, in an embodiment, advertisement selector 206 may be configured to select an advertisement to be displayed at an advertisement space of a web page at a refresh time indicated by synchronized refresh rate 212, and to select the advertisement based on a difference in current content and previous content of the web page. A web page, such as web page 410, may have any number and location of advertisements spaces for displaying advertisements. For example, referring to FIG. 1, web page 106 includes three advertisement spaces where advertisements 110a-110c are respectively displayed.

As described above with respect to FIG. 2, advertisement selector 206 may receive synchronized refresh rate 212 and content information 216. Content information 216 provides information regarding content of the web page (e.g., web page 106 of FIG. 1, web page 410 of FIG. 4, etc.). For example, content information 216 may provide information indicating a current content of the web page, a previous content of the web page, and/or a difference between the current content and previous content of the web page. Advertisement selector 206 is configured to generate advertisement selection 214 based on synchronized refresh rate 212 and content information 216. Advertisement selection 214 indicates an advertisement that may be provided (e.g., by an ad server) to be displayed on the web page at a refresh time indicated by refresh rate 212 (e.g., a next refresh time).

Figure 8:
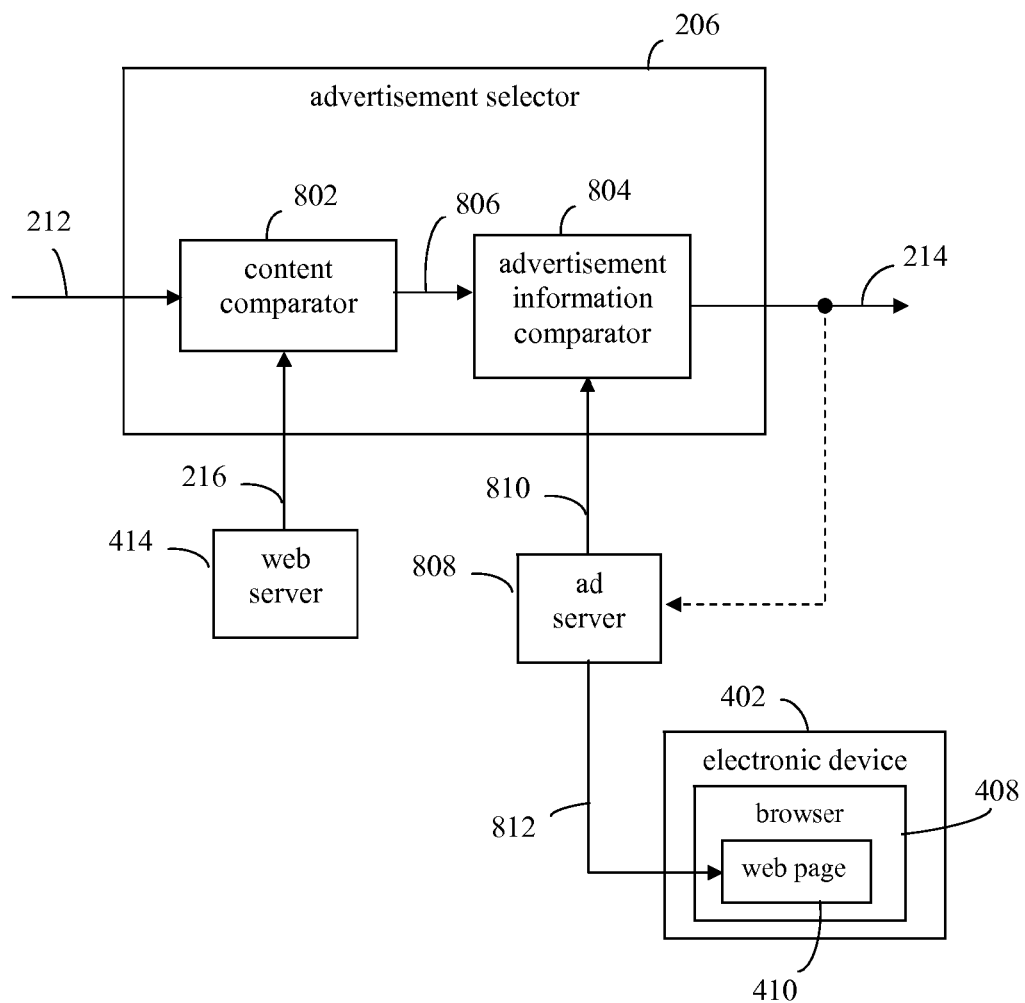
FIG. 8 shows a block diagram of an advertisement selector communicatively coupled with a web server and an ad server, according to an example embodiment.

Advertisement selector may be configured in various ways to select an advertisement. For instance, FIG. 8 shows a block diagram of advertisement selector 206 communicatively coupled with web server 414 and an ad server 808, according to an example embodiment. As shown in the example of FIG. 8, advertisement selector 206 may include a content comparator 802 and an advertisement information comparator 804. These elements of advertisement selector 206 are described as follows.

As shown in FIG. 8, content comparator 802 receives synchronized refresh rate 212 and content information 216. In an embodiment, synchronized refresh rate 212 may include the synchronized refresh rate generated by refresh rate generator 204 (e.g., a numerical value of the refresh rate), and content comparator 802 may include a clock module that generates refresh pulses at refresh times according to the synchronized refresh rate. In another embodiment, synchronized refresh rate 212 may include refresh pulses generated by refresh rate generator 204 according to the synchronized refresh rate.

When a refresh time occurs (e.g., time point 518 shown in FIG. 5), content comparator 802 may be configured to compare content of the web page (e.g., web page 106 of FIG. 1, web page 410 of FIG. 4, etc.) at the current refresh time to a content of the web page at a previous refresh time (e.g., at the most recent prior refresh time at which an advertisement was selected) of synchronized refresh rate 212 to determine a content difference 806. For example, web server 414 may generate content information 216 to include information regarding content of the web page at the current refresh time, and to include content of the web page at the previous refresh time. In another embodiment, content information 216 include information regarding the content of the web page at the current refresh time, while not including content of the web page at the previous refresh time, because content comparator 802 may be configured to store the content of the web page at the previous refresh time (which may have been received by content comparator 802 at the previous refresh time in content information 216). In such case, advertisement selector 206 may include storage (e.g., one or more of a hard disc drive, a memory device, etc.) to store content information for the web page received at previous refresh times.

Content comparator 802 may generate content difference 806 in any manner, including by performing a textual "diff" function, where text of the content of the web page at the previous refresh time is compared to text of the content of the web page at the current refresh time, to determine any different text (e.g., new text, modified text, etc.). The different text may be included in content difference 806. Similarly, other forms of the content of the web page at the previous and current refresh times may be compared, including directly comparing images, video, audio, etc., and/or comparing metadata associated with the images, video, audio, etc. Any differences in such content between the previous and current refresh times may be included in content difference 806.

In another embodiment, content information 216 received from web server 414 may include a determined difference between the current content and previous content of the web page, which may have been generated at web server 414. In such case, content comparator 802 may not need to be present in advertisement selector 206.

Note that in embodiments, further information may be included by content comparator 802 in content difference 806 to aid advertisement selector 804 in selecting advertisements. For example, in an embodiment, content information 216 received from web server 414 may include information from one or more prior interactions by user 404a with web page 410. For instance, user 404a may enter data into a data entry box/form of web page 410 (e.g., a textual message, form data, etc.), may click on links and/or images shown in web page 410 (e.g., that display products/services), may interact with web page 410 to enact a purchase of a product or service, etc. The data entered or interactions by user 404a with web page 410 may be indicated in content difference 806 to be used to match advertisements by advertisement information comparator 804. Furthermore, information may be included by content comparator 802 in content difference 806 to enable advertisement selector 804 to take into account refresh times of the synchronized refresh rate at which the user did not view web page 410 when selecting advertisements and/or times at which the user viewed web page 410 that were not at refresh times of the synchronized refresh rate. For instance, if user 404a departs from a regular revisitation pattern by not viewing web page 410 at a particular refresh time, or by viewing web page 410 between refresh times, this may indicate information regarding interests and/or preferences of user 404a, which may be used to select advertisements.

As shown in FIG. 8, advertisement information comparator 804 receives content difference 806 from content comparator 802 and receives advertisement information 810 from ad server 808. Advertisement information comparator 804 may be configured to compare the content differences between the previous and current refresh times indicated in content difference 806 to advertisement information 810 to select one or more advertisements 812 to be displayed in the web page at the current refresh time (and potentially until the next refresh time). For instance, advertisement information 810 may include an index of keywords that are associated with any number of advertisements, which may be identified in the index by identification number or other manner. Advertisement information comparator 804 may parse content difference 806 for keywords (e.g., nouns, verbs, product names, service names, etc.), and may compare the keywords found in content difference 806 with the keywords of advertisement information 810 to select one or more advertisements associated with the keywords, to generate advertisement selection 214. Advertisement selection 214 indicates the selected one or more advertisements listed in advertisement information 810 that may be provided by ad server 808 to be displayed on the web page at refresh time indicated by refresh rate 212 (e.g., a next refresh time). For instance, advertisement selection 214 may include identification numbers for the selected advertisements.

Figure 9:
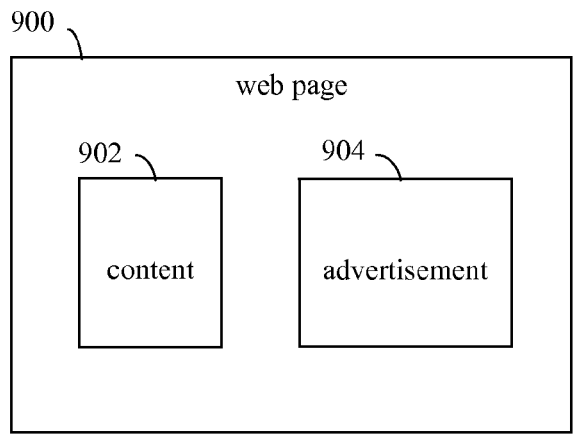
FIGS. 9-11 show block diagrams of views of a web page that may be displayed at an electronic device at various points of time, according to embodiments.
Figure 10:
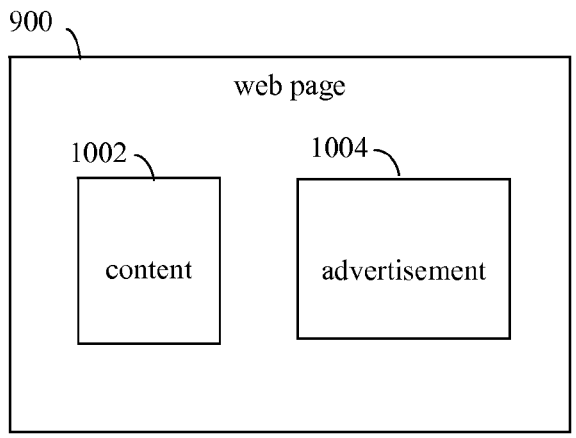
Figure 11:
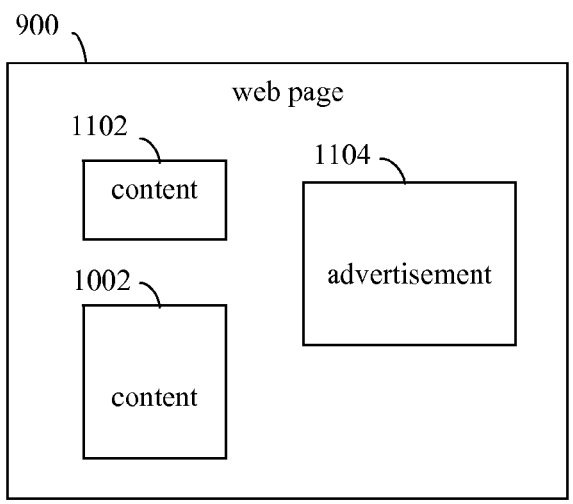

For example, FIGS. 9-11 show block diagrams of views of a web page 900 that may be displayed at an electronic device at sequential points of time, according to embodiments. Web page 900 is an example of web page 410, and may be any type of web page that provides content, including a news web page, a blog, a social networking web page, etc. FIG. 9 shows a view of web page 900 at a first refresh time (e.g., time point 518 in FIG. 5), where a first content 902 (e.g., text, video, images, audio, etc.) is provided (e.g., displayed) in web page 900 to accessing users, such as user 404a of FIG. 4. The first refresh time is an initial refresh time of the synchronized refresh rate 212. At the first refresh time, a first advertisement 904 is also provided in web page 900. First advertisement 904 may be selected by advertisement selector 206, for example.

FIG. 10 shows a view of web page 900 at a second refresh time (e.g., time point 524 in FIG. 5), where a second content 1002 is provided in web page 900 to accessing users, such as user 404a. The second refresh time is a second refresh time indicated by synchronized refresh rate 212, being separated from the first refresh time by one cycle/one period of synchronized refresh rate 212 (or by a plurality of cycles/periods if synchronized refresh rate 212 is a scaled version of revisitation rate 210). Second content 1002 is different from first content 902 shown in FIG. 9. A second advertisement 1004 is selected by advertisement selector 206 to be displayed in web page 900 at the second refresh time based on content difference 806, which indicates a difference between first content 902 and second content 1002 (e.g., as determined by content comparator 802). For example, if web page 900 is a news web page, first and second content 902 and 1002 may show news articles, where second content 1002 includes updated news with respect to first content 902.

FIG. 11 shows a view of web page 900 at a third refresh time (e.g., time point 530 in FIG. 5), where a third content 1102 is provided in web page 900 to accessing users, such as user 404a, in addition to second content 1002. The third refresh time is a third refresh time indicated by synchronized refresh rate 212, being separated from the second refresh time by one cycle/one period of synchronized refresh rate 212 (or by a plurality of cycles/periods if synchronized refresh rate 212 is a scaled version of revisitation rate 210). Third content 1102 is content added to web page 900 in addition to second content 1002 shown in FIG. 10, subsequent to second content 1002. For example, if web page 900 is a blog web page, third content 1102 may include the blog entries entered by the blogger that manages web page 900 subsequent to having entered second content 1002. Third advertisement 1004 is selected by advertisement selector 206 to be displayed in web page 900 at the third refresh time based on content difference 806, which indicates third content 1102 as the difference in content between web page 900 at the second and third refresh times (e.g., as determined by content comparator 802).

Note that in an embodiment, advertisements 904, 1004, and 1104 may be related or unrelated. For example, in an embodiment, a predetermined sequence of advertisements, such as advertisements 904, 1004, and 1104 may be displayed in series at consecutive refresh times to enable a multi-ad advertising campaign. For instance, in such an advertising campaign, a plurality of advertisements may be displayed sequentially to provide a complete advertising message. Each subsequent advertisement may provide additional information to a previous advertisement in the sequence. For example, advertisement selector 206 may select advertisement 904 as a first advertisement of a predetermined sequence of three advertisements to be displayed at a first refresh time. Advertisement selector 206 may select advertisement 1004 as a second advertisement of the predetermined sequence of three advertisements to be displayed at the second refresh time, subsequent to advertisement 904. Advertisement selector 206 may select advertisement 1104 as a third advertisement of the predetermined sequence of three advertisements to be displayed at the third refresh time, subsequent to advertisement 1004. In such an example, advertisements 904, 1004, and 1104 may provide a complete advertising message when displayed in sequence. Any number of advertisements may be included in the predetermined sequence of advertisements of the advertising campaign. Furthermore, by synchronizing display of advertisements 904, 1004, and 1104 with user revisitation rates, the users are more likely to see each of advertisements 904, 1004, and 1104 than according to conventional techniques, to experience the multi-ad advertising campaign more completely.

As shown in FIG. 8, advertisement selector 206 generates advertisement selection 214, which indicates one or more advertisements selected to be displayed on web page 410 for a particular refresh time based on a change in content of web page 410 from a previous refresh time. In the example of FIG. 8, ad server 808 receives advertisement selection 214. As a result, ad server 808 may provide the selected one or more advertisements to be displayed in web page 410 when a user of electronic device 402 displays web page 410 at or after the refresh time (e.g., using browser 408). At each subsequent refresh time, advertisement selection 214 indicates a next advertisement (or advertisements), selected as described above, to be provided by ad server 808 to be displayed in web page 410 when viewed by a user.

IV. Example Computer Implementations

Advertisement selection system 200, revisitation rate determiner 202, refresh rate synchronizer 204, advertisement selector 206, spectral analyzer 602, revisitation rate scaler 702, content comparator 802, and advertisement information comparator 804 may be implemented in hardware, software, firmware, or any combination thereof. For example, advertisement selection system 200, revisitation rate determiner 202, refresh rate synchronizer 204, advertisement selector 206, spectral analyzer 602, revisitation rate scaler 702, content comparator 802, and/or advertisement information comparator 804 may be implemented as computer program code configured to be executed in one or more processors. Alternatively, advertisement selection system 200, revisitation rate determiner 202, refresh rate synchronizer 204, advertisement selector 206, spectral analyzer 602, revisitation rate scaler 702, content comparator 802, and/or advertisement information comparator 804 may be implemented as hardware logic/electrical circuitry.

Figure 12:
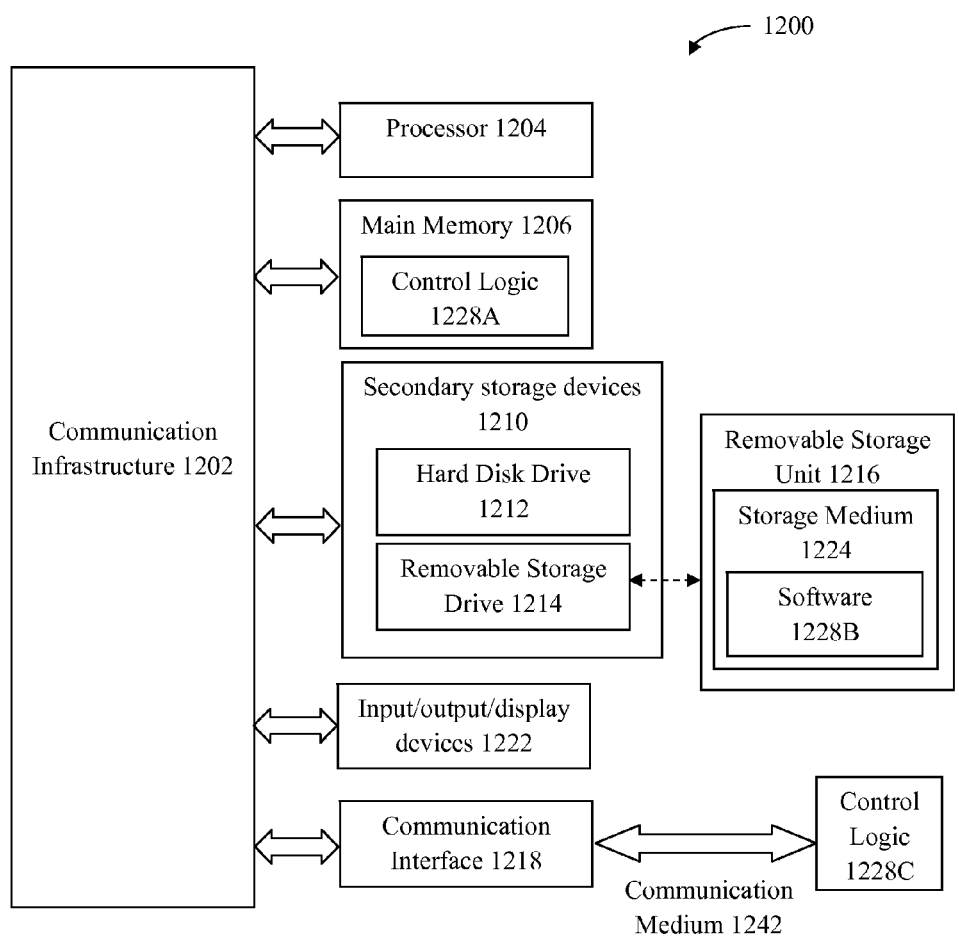
FIG. 12 shows a block diagram of an example computer system in which embodiments of the present invention may be implemented.

The embodiments described herein, including systems, methods/processes, and/or apparatuses, may be implemented using well known servers/computers, such as a computer 1200 shown in FIG. 12. For example, computer 102, electronic devices 402, and/or embodiments of advertisement selection system 200 can be implemented using one or more computers 1200.

Computer 1200 can be any commercially available and well known computer capable of performing the functions described herein, such as computers available from International Business Machines, Apple, Sun, HP, Dell, Cray, etc. Computer 1200 may be any type of computer, including a desktop computer, a server, etc.

Computer 1200 includes one or more processors (also called central processing units, or CPUs), such as a processor 1204. Processor 1204 is connected to a communication infrastructure 1202, such as a communication bus. In some embodiments, processor 1204 can simultaneously operate multiple computing threads.

Computer 1200 also includes a primary or main memory 1206, such as random access memory (RAM). Main memory 1206 has stored therein control logic 1228A (computer software), and data.

Computer 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computer 1200 may include an industry standard interface, such a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1224 having stored therein computer software 1228B (control logic) and/or data. Removable storage unit 1216 represents a floppy disk, magnetic tape, compact disk, DVD, optical storage disk, or any other computer data storage device. Removable storage drive 1214 reads from and/or writes to removable storage unit 1216 in a well known manner.

Computer 1200 also includes input/output/display devices 1222, such as monitors, keyboards, pointing devices, etc.

Computer 1200 further includes a communication or network interface 1218. Communication interface 1218 enables the computer 1200 to communicate with remote devices. For example, communication interface 1218 allows computer 1200 to communicate over communication networks or mediums 1242 (representing a form of a computer useable or readable medium), such as LANs, WANs, the Internet, etc. Network interface 1218 may interface with remote sites or networks via wired or wireless connections.

Control logic 1228C may be transmitted to and from computer 1200 via the communication medium 1242.

Any apparatus or manufacture comprising a computer useable or readable medium having control logic (software) stored therein is referred to herein as a computer program product or program storage device. This includes, but is not limited to, computer 1200, main memory 1206, secondary storage devices 1210, and removable storage unit 1216. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for advertisement selection system 200, revisitation rate determiner 202, refresh rate synchronizer 204, advertisement selector 206, spectral analyzer 602, revisitation rate scaler 702, content comparator 802, advertisement information comparator 804, and/or flowchart 300 (including any one or more steps of flowchart 300), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

V. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for displaying advertisements on web pages, comprising:
   determining a revisitation rate for views of a web page by a user population;
   synchronizing a refresh rate for an advertisement space on the web page with the determined revisitation rate; and
   selecting an advertisement to be displayed at the advertisement space at a particular refresh time of the synchronized refresh rate based at least on a difference between a content of the web page at the particular refresh time and a content of the web page at a previous refresh time of the synchronized refresh rate of, wherein said synchronizing comprises:
   calculating the synchronized refresh rate by dividing the determined revisitation rate by N, where N is an integer greater than 1.

2. A system for displaying advertisements on web pages, comprising:
   a revisitation rate determiner, at least partially implemented by a computer, configured to determine a revisitation rate for views of a web page by a user population;
   a refresh rate synchronizer configured to synchronize a refresh rate for an advertisement space on the web page with the determined revisitation rate; and
   an advertisement selector configured to select an advertisement to be displayed at the advertisement space at a particular refresh time of the synchronized refresh rate based at least on a difference between a content of the web page at the particular refresh time and a content of the web page at a previous refresh time of the synchronized refresh rate, wherein the refresh rate synchronizer comprises:

a revisitation rate scaler configured to calculate the synchronized refresh rate by dividing the determined revisitation rate by N, where N is an integer greater than 1.

3. A computer program product comprising a computer readable medium having computer program logic recorded thereon for enabling a processor to display advertisements on web pages, comprising:
- means for determining a revisitation rate for views of a web page by a user population;
- means for synchronizing a refresh rate for an advertisement space on the web page with the determined revisitation rate; and
- means for selecting an advertisement to be displayed at the advertisement space at a particular refresh time of the synchronized refresh rate based at least on a difference between a content of the web page at the particular refresh time and a content of the web page at a previous refresh time of the synchronized refresh rate, wherein the means for synchronizing comprises:
- means for calculating the synchronized refresh rate by dividing the determined revisitation rate by N, where N is an integer greater than 1.

\* \* \* \* \*